Feb. 27, 1962 H. CASSMAN 3,023,131

METHOD OF FORMING A PHOTO-EMISSIVE SURFACE AND COATED ARTICLE

Filed June 23, 1958

Inventor
H. Cassman
By Glascock Downing & Seebold
Attys.

3,023,131
METHOD OF FORMING A PHOTO-EMISSIVE SURFACE AND COATED ARTICLE

Harry Cassman, London, England, assignor to Electric & Musical Industries Limited, Hayes, Middlesex, England, a company of Great Britain Filed June 23, 1958, Ser. No. 743,795
Claims priority, application Great Britain June 26, 1957
7 Claims. (Cl. 117—210)

Figure 1:
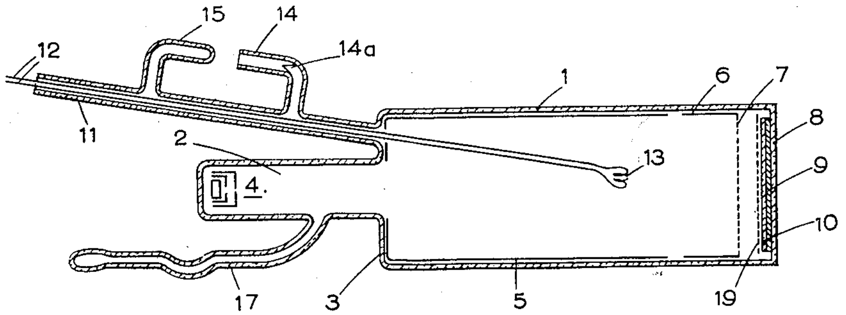

This invention relates to a method of forming a photo-emissive surface and is particularly, although not exclusively applicable to such a surface formed as a photo-emissive mosaic in a television pick-up tube.

It has been proposed to provide a photo-emissive surface composed of antimony sensitized with a plurality of alkali metals. Usually antimony mosaic elements are provided on a support in an evacuated envelope and the alkali metals are evaporated in turn onto said elements, the evaporation of each metal being continued until the photo-emissive sensitivity of the elements, that is the efficiency with which said elements emit photo electrons when exposed to light, reaches a peak. In order to detect the peak value a slight excess of the metal must be introduced, and moreover if evaporation of said metal takes place from a position remote from the elements further excess metal may be deposited on the elements after evaporation thereof has ceased. Furthermore some of the alkali metals will usually condense on parts of the envelope other than the antimony surface and one alkali metal may be displaced from such envelope parts by a subsequently evaporated alkali metal and condensed on said surface so as to increase the excess quantity of said first alkali metal. Thus the sensitivity of the surface is decreased and it is found that the excess quantity of the alkali metal or metals cannot readily be driven off from the antimony surface so that the peak sensitivity cannot be recovered.

An object of the present invention is to provide an improved method of forming a photo-emissive surface comprising antimony sensitized with a plurality of alkali metals.

According to the present invention there is provided a method of forming a photo-emissive surface comprising antimony sensitized with a plurality of different alkali metals, said method including providing an antimony surface on a support, evaporating a quantity of a first alkali metal onto said surface such that the photo-emissive sensitivity of said surface rises to a value which is less than a peak value, and subsequently evaporating a quantity of another alkali metal onto said surface such that the photo-emissive sensitivity of said surface can be brought to a peak value. Preferably the antimony is sensitized with two different alkali metals other than caesium, evaporated in such quantities that the surface does not reach peak sensitivity and subsequently caesium is evaporated in such a quantity to enable the sensitivity of said surface to be brought to a peak value. If desired oxygen may finally be slowly admitted so as further to increase the sensitivity of the layer.

Thus in the preferred form of the invention caesium, is provided in excess and this can subsequently be partly removed from the surface during baking so as to enable a peak sensitivity of the surface to be achieved. In the event that sodium is the alkali metal or one of the alkali metals evaporated in such a quantity that the surface does not reach peak sensitivity the reduction in the quantity of sodium relatively to that in the previously proposed method has an added advantage inasmuch as it is found that sodium attacks the support when this is made of glass and has a deleterious effect thereon.

Figure 2:
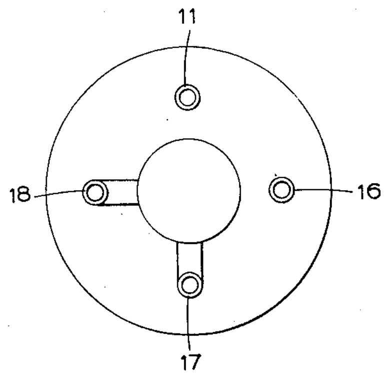

In order that the present invention may be clearly understood and readily carried into effect, it will now be more fully described with reference to the accompanying drawings, in which:

FIGURE 1 shows a cross sectional view of a television pick-up tube adapted to have a photo-emissive mosaic formed therein in accordance with the present invention, and FIGURE 2 is an end elevation of the tube of FIGURE 1 on an enlarged scale.

Referring to the drawings the invention is shown, by way of example, as applied to the formation of the photo-emissive mosaic of a television pick-up tube of the cathode potential stabilized type. As shown in FIGURE 1 of the drawings the pick-up tube comprises a tubular envelope 1 having at one end a tubular neck portion 2 so as to provide a shoulder 3. The neck portion 2 accommodates an electron gun 4 and the envelope 1 is provided with a wall anode 5, and a ring electrode 6 to which is connected an ion trap mesh 7. A target is arranged to be mounted on the wall 8 of the envelope 1 remote from the neck portion 2 and comprises a substantially transparent signal electrode 9 and an insulating sheet 10, preferably of glass, forming the support for the mosaic elements which in the present embodiment of the invention comprise elements of antimony which are thereafter sensitized, such as with a plurality of alkali metals including caesium. For the purpose of forming the photo-emissive mosaic elements the envelope is provided with four side tubes and as shown in FIGURE 2 two of these tubes are sealed to the shoulder 3 and two are sealed to the neck portion 2, the four side tubes being disposed around said neck portion 2. One side tube 11 sealed to the shoulder 3 is arranged to be connected to a pump for evacuating the envelope 1 and also accommodates magnetically movable leads 12 to a heating coil 13 which supports a pellet of antimony, said leads 12 being arranged to have passed therethrough a heating current so as to heat said coil 13 and evaporate the antimony. The side tube 11 is provided with auxiliary tubes 14 and 15. The tube 14 is provided with a breaker pip **14*a* and the tube 15 is sealed at its end prior to commencement of the formation of the mosaic elements. The purposes of the tubes 14 and 15 will hereinafter be described. The other side tube 16 sealed to the shoulder 3, which side tube is shown only in FIGURE 2, is arranged to accommodate materials which on heating generate caesium. For example said side tube 16 may accommodate caesium chromate and silicon. The two side tubes 17 and 18 sealed to the neck portion 2, of which the tube 17 is shown in both FIGURES 1 and 2 whilst the tube 18 is shown only in FIGURE 2, are arranged to accommodate materials which on heating respectively generate two alkali metals, in the present embodiment, sodium and potassium. Thus the side tube 17 accommodates, for example a mixture of sodium chromate, aluminium and tungsten which generate sodium on heating and the side tube 18** accommodates, for example a mixture of potassium chromate, aluminium and tungsten which generate potassium on heating.

A metal mesh 19 made of silver or copper is mounted so as to press against the surface of the support 10 on which the elements of antimony are required to be formed, said mesh serving as a stencil during the formation of the mosaic elements and being arranged subsequently to serve as a stabilising mesh during operation of the tube. The mesh is mounted in a frame and is of the kind adapted to be shaken away from the antimony mosaic elements when said elements are formed on the sheet 10, as described in United States Patent Number 2,779,887.

In order to form the mosaic elements on the support 10 envelope 1 is evacuated, the coil 13 supporting a pellet of antimony is moved magnetically into the position shown, and current is applied to the leads 12 so as to heat said coil 13 and evaporate the antimony through the mesh 19 and thereby form antimony elements on the support 10. Antimony is evaporated in this manner until the transparency of the target is reduced to about 50% of its original transparency. The coil 13 and leads 12 are then retracted magnetically into the side tube 11 to a position beyond the junction of said tube 11 with the auxiliary tube 14, and the envelope is baked to a temperature of between 200° C. and 210° C. whilst a small quantity of sodium is driven from the side tube 17 into the envelope 1 and deposited on the antimony mosaic elements until a low sensitivity of the order of .005 microampere per lumen, is achieved. The envelope 1 is then sealed off from the pump by heating the side tube 11 between the two auxiliary tubes 14 and 15, and the mesh 19 is withdrawn from the support 10 by shaking the envelope 1 as described in the aforesaid specification, so as to be in a position suitable for operating as a stabilizing mesh during subsequent operation of the pick-up tube. The deposition of the small quantity of sodium during the baking process aforesaid causes the sodium to alloy with the antimony so as to cause the antimony to adhere more firmly to the support 10 so that said antimony is not rubbed away when the mesh 19 is withdrawn from the support in the manner described. When the invention is applied to other photo-emissive surfaces in which it is not required to employ the mesh 19 as a stabilizing mesh, said mesh will usually not be mounted in a frame but will normally be held in contact with the support 10 electrostatically and subsequently allowed to fall away. In such an arrangement the problem of rubbing away the antimony on withdrawal of the mesh does not normally exist and so the initial deposition of a small quantity of sodium or other alkali metal for the purpose of preventing rubbing away is not necessary. The envelope 1 is again sealed to the pump by sealing the auxiliary tubes 14 and 15 together and prior to such sealing a small slug of magnetic material is inserted in the side tube 14, the pressure of the air in the portion of the tubes between the breaker pip 14*a* and the pump is reduced to equal the pressure in the envelope 1, and by movement of the slug by an external magnet the breaker pip 14*a* is broken so as to connect the interior of the envelope 1 to the pump. The envelope 1 is then baked to a temperature of approximately 170° C. whilst potassium is evaporated from the side tube 18, drifted into envelope 1 and deposited on the antimony mosaic, said baking temperature being sufficient to cause said potassium to alloy with said antimony. Potassium is deposited on the mosaic until the sensitivity of said mosaic elements reaches approximately 1 microampere per lumen, this being approximately one fifth of the peak sensitivity which could be attained by continued deposition of potassium. The side tube 18 is then sealed off and the envelope 1 is baked to a temperature of approximately 200° C. which is sufficient to cause sodium to alloy with the metals already deposited. Sodium from the side tube 17 is again evaporated, drifted into the envelope 1, and deposited on the antimony elements until the sensitivity thereof reaches approximately 5 microamperes per lumen which again is approximately one fifth of the peak sensitivity which could be attained by continued deposition of sodium. The side tube 17 is then sealed off from the envelope and the side tube 11 is heated by means of a flame to degas it and to release a further small amount of potassium originally deposited on the surface thereof and cause said potassium to deposit on the antimony mosaic elements so as to effect a slight increase in the sensitivity thereof. Caesium is then evaporated from the side tube 16 whilst the envelope 1 is baked to a temperature between 140° C. and 160° C. which is sufficient to cause said caesium to alloy with the metals already deposited. Caesium is introduced into the envelope 1 and deposited on the antimony elements until the sensitivity of said elements passes its peak value which is approximately 50 micro-amperes per lumen and falls to about one tenth thereof, when the caesium side tube 16 is sealed off from the envelope 1. The envelope 1 is subsequently baked to a temperature between 140° C. and 160° C. until the sensitivity of the antimony elements reaches a peak during which time the excess caesium is released from the elements and pumped out of the envelope. If desired the envelope 1 may then be cooled to about 130° C. and oxygen may be admitted carefully to increase the sensitivity further until a sensitivity peak is acquired. It is not essential to introduce oxygen to increase the sensitivity in this manner but it is usually desirable, especially when the sensitivity of the photo emissive surface to red light is less than 20% of its sensitivity to white light.

The envelope is preferably allowed to cool slowly to about 80° C. before being removed from the oven in which it is baked so as to prevent sudden changes in ambient temperature.

Thus in the method described the deposition of the alkali metals other than caesium is ceased before the photo-emissive sensitivity of the photo electric elements reaches a peak value so that an excess of these metals is not introduced into the tube. Caesium, which is introduced into the tube in excess can subsequently partly be evaporated away from the photo electric elements so as to regain peak sensitivity. As hereinbefore stated when the alkali metals are drifted into the envelope 1 some proportion thereof frequently deposits on the wall anode and envelope wall, for example, and a second metal can displace a first metal and so increase the quantity of the first metal deposited on the photo electric elements. It is found that usually sodium displaces potassium more readily than potassium displaces sodium due to the higher vapour pressure of potassium. For this reason it is preferable to evaporate sodium rather than potassium prior to withdrawal of the mesh 19 to prevent rubbing away of the antimony during said withdrawal so that an alloy of sodium and antimony rather than one of potassium and antimony is formed on the wall anode and envelope walls. During subsequent sensitization of the antimony potassium is evaporated prior to sodium since in the particular design of the cathode potential stabilized tube described a better sensitivity is achieved by this order than by evaporating sodium before potassium. In the event, however, that in other constructions of tubes the surface is such that equally good results are obtained by sensitization in either order it would be preferable to evaporate sodium before potassium for the reason given above.

Although the present invention has been particularly described with reference to a television pick-up tube of the cathode potential stabilized type it can of course, be applied to the formation of other photo-emissive surfaces, for example for use as a photo-cathode in a photocell or photo multiplier or as a photo-emissive target in other types of television pick-up tubes such as one in which a photo emissive target is scanned by a light spot. Moreover although the alkali metals described are sodium, potassium and caesium other alkali metals such as lithium and rubidium can be employed for sensitizing the antimony layer, any combination of the alkali metals referred to being suitable. When such other alkali metals are employed it will be appreciated that during evaporation thereof the tube should be baked at a temperature sufficient to cause the metal to drift within the tube to the antimony surface and also to cause said alkali metal to alloy with previously deposited metals.

What I claim is:

1. A method of forming a photo-emissive surface comprising antimony sensitized with a plurality of different alkali metals, said method including providing an antimony surface on a support, evaporating a quantity of a first alkali metal onto said surface such that the photo-emissive sensitivity of said surface rises to a value which is less than a peak value, and subsequently evaporating a quantity of another alkali metal onto said surface such that the photo-emissive sensitivity of said surface can be brought to a peak value.

2. An article and a photo-emissive coating on said article formed according to the method of claim 1.

3. A method according to claim 1 comprising applying oxygen to said sensitized surface to increase the sensitivity thereof.

4. A method of forming a photo-emissive surface comprising antimony sensitized with three different alkali metals, said method including providing an antimony surface on a support, evaporating a quantity of a first alkali metal onto said surface such that the photo-emissive sensitivity of said surface rises to a value which is less than a peak value, subsequently evaporating a quantity of a second alkali metal onto said surface such that the photo-emissive sensitivity of said surface rises to a value which is less than a peak value, and subsequently evaporating a quantity of the third alkali metal onto said surface such that said photo-emissive sensitivity can be brought to a peak value.

5. A method according to claim 4 in which said first alkali metal is sodium and said second alkali metal is potassium.

6. A method of forming a photo-emissive surface comprising antimony sensitized with sodium, potassium and caesium, said method including providing an antimony surface on a support, evaporating a quantity of potassium onto said surface such that the photo-emissive sensitivity of said surface rises to approximately 1 micro-ampere per lumen, subsequently evaporating a quantity of sodium onto said surface such that the photo-emissive sensitvity of said surface rises to approximately 5 micro-amperes per lumen, subsequently evaporating a quantity of caesium onto said surface such that the photo-emissive sensitivity of said surface rises to a peak value and falls to approximately one tenth of said peak value, and subsequently baking said surface to release a quantity of caesium from said surface such that said sensitivity rises to a peak value.

7. A method of forming a photo-emissive surface comprising antimony mosaic elements sensitized with potassium, sodium and caesium, said method including disposing a stencil in close proximity to a support, depositing antimony onto said support through said stencil to form antimony mosaic elements, depositing a small quantity of sodium onto said mosaic elements through said stencil, causing said sodium to alloy with said antimony, moving said stencil away from said support, subsequently evaporating a quantity of potassium onto said surface such that the photo-emissive sensitivity of said surface rises to approximately 1 micro-ampere per lumen, subsequently evaporating a quantity of sodium onto said surface such that the photo-emissive sensitivity of said surface rises to approximately 5 micro-amperes per lumen, subsequently evaporating a quantity of caesium onto said surface such that the photo-emissive sensitivity of said surface rises to a peak value and falls to approximately one tenth of said peak value, and subsequently baking said surface to release a quantity of caesium from said surface such that said sensitivity rises to a peak value.

References Cited in the file of this patent

UNITED STATES PATENTS

| | | |
|---|---|---|
| 2,745,772 | Cassman | May 15, 1956 |
| 2,770,561 | Sommer | Nov. 13, 1956 |

FOREIGN PATENTS

| | | |
|---|---|---|
| 702,824 | Great Britain | Jan. 27, 1954 |